Nov. 4, 1947.  T. A. BYERS  2,430,156
EGG SEPARATOR
Filed Feb. 3, 1945

INVENTOR.
Thomas A. Byers
BY
*Glenn L. Fish*
ATTORNEYS.

Patented Nov. 4, 1947

2,430,156

UNITED STATES PATENT OFFICE 2,430,156

EGG SEPARATOR

Thomas A. Byers, Spokane, Wash.

Application February 3, 1945, Serial No. 576,049

1 Claim. (Cl. 146—2)

This invention relates to an egg separator and it is one object of the invention to provide a separator of such construction that it may be supported across a bowl or similar dish and the white caught as it flows from about the yolk of an egg dropped into the separator.

An other object of the invention is to provide a separator which includes a cup to receive the egg and hold the yolk thereof as the white flows from the yolk down into a dish.

Another object of the invention is to provide a separator wherein an annular throat is mounted over the yolk-holding cup for guiding the egg to the cup, the cup being perforated to permit air to escape and form a vacuum under the yolk for holding the yolk in the cup while the white runs over the edge of the cup and down into a bowl or other dish across which the separator is disposed.

Another object of the invention is to provide a separator having its yolk-holding cup formed with a sharp marginal edge so that the white will be cut loose as it flows over the edge of the cup.

Another object of the invention is to provide a separator having a throat or guide which is so mounted that, while it will be firmly held against accidental displacement, it may be removed for thorough cleaning after the separator has been used.

Another object is to provide an egg separator which is simple in construction, cheap to manufacture, and very efficient in operation.

This improved egg separator has an annular guide or throat 1 which tapers downwardly and is removably carried by an annular frame 2 into which it is pressed until its outstanding, outwardly curved flange 3 bears against the upper face of the frame. Adjacent its upper end, the throat is outwardly thickened to form an outstanding bead 4 which has wedging fit in the frame and frictionally holds the throat in place. By exerting upward pressure against the lower end of the throat it may be forced upwardly and dislodged and the strainer thoroughly cleaned after being used and then reassembled. Handles 5 project radially from the frame in opposed relation to each other so that when the separator is in use it may be disposed across a bowl or other suitable deep dish and supported across the bowl by its handles resting upon the upper edges of the bowl. Openings 6 are formed near outer ends of the handles in order that the separator may be suspended from a nail or hook when not in use.

Figure 1:
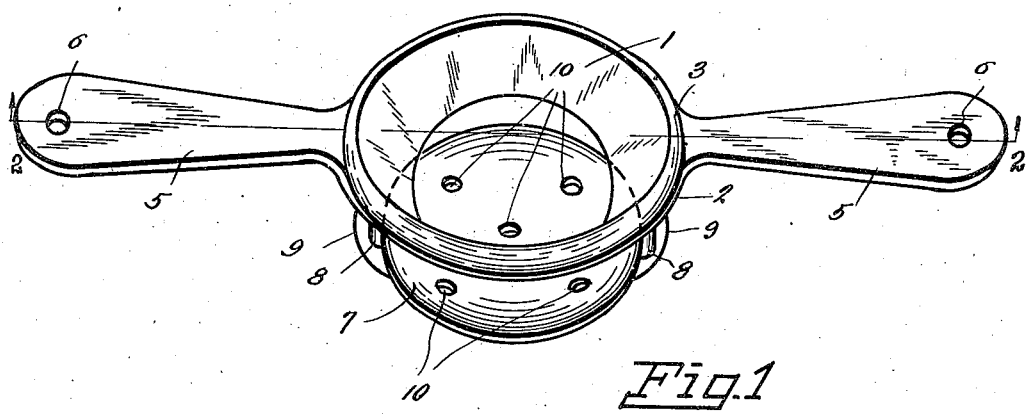
Fig. 1 is a perspective view of the improved egg separator.
Figure 2:
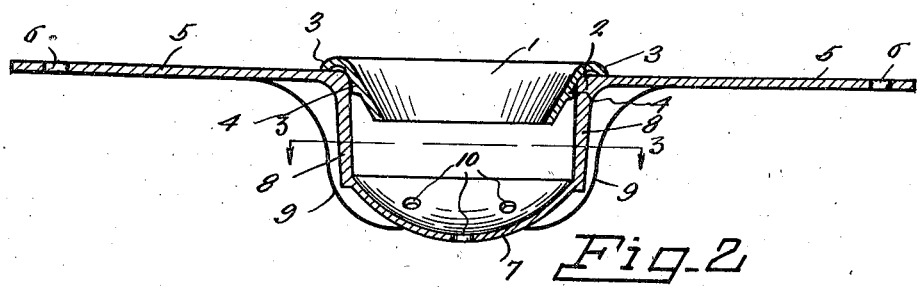
Fig. 2 is a sectional view on the line 2—2 of Fig. 1.
Figure 3:
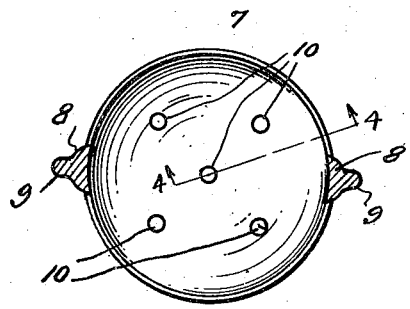
Fig. 3 is a transverse sectional view on the line 3—3 of Fig. 2.
Figure 4:
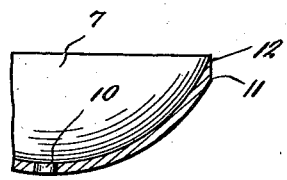
Fig. 4 is a fragmentary sectional view taken through the cup on the line 4—4 of Fig. 3.

The cup 7 is formed integral with lower ends of arms 8 which extend downwardly from the frame 2 at inner ends of the handles 5 and, in order to reinforce these arms and prevent the cup from being broken loose from the lower ends thereof, there have been provided webs 9 which have their upper ends extended outwardly and united with under faces of the handles and their lower ends overlapping and integrally united with the under face of the cup. The cup is of substantially hemispherical formation in order that it may receive and hold a yolk of an egg, and through the cup are formed a number of openings 10 so that when an egg drops into the cup, air will be permitted to escape through said openings and a partial vacuum formed for holding the egg yolk in the cup while the white flows from about the yolk over the peripheral edge of the cup downwardly into a bowl across which the separator is placed. The marginal edge portion of the cup is beveled, as shown at 11 in Fig. 4, to form the cup with a sharp marginal edge 12 and cause the white to be cut off from the yolk as it runs over the edge of the cup. After the white has been separated from the yolk in the cup and drops into the bowl, the separator is grasped by one handle and lifted from the bowl so that the yolk may be transferred from the cup into another bowl or other receptacle by holding the separator over the second bowl and tilting it to a pouring angle.

Having thus described the invention, what is claimed is:

An egg separator comprising an annular frame having handles extending radially from opposite sides thereof, arms depending from said frame at inner ends of said handles, a hemispherical cup mounted between lower ends of said arms and formed with perforations, reinforcing webs extending along outer sides of said arms with their upper portions extending outwardly and united with under faces of the handles and their lower ends engaging under the under face of the cup and united therewith, and a downwardly tapered throat for guiding an egg to said cup fitting within the annular frame and having an outstanding transversely curved annular flange about its upper end for resting upon said frame, a portion of the throat spaced downwardly from the flange being outwardly thickened and forming a circumferentially extending bead fitting snugly in the frame in frictional gripping engagement with the inner surface thereof to removably hold the throat in the frame.

THOMAS A. BYERS.

REFERENCES CITED

The following references are of record in the file of this patent:

UNITED STATES PATENTS

| Number | Name | Date |
|---|---|---|
| 1,759,512 | Kramer et al. | May 20, 1930 |
| 941,415 | Heatherington et al. | Nov. 30, 1909 |
| 657,125 | Lindsay | Sept. 4, 1900 |